April 10, 1934.  D. L. WOOD  1,954,340

PHOTOGRAPHIC OBJECTIVE

Filed Jan. 30, 1933

Fig.1.

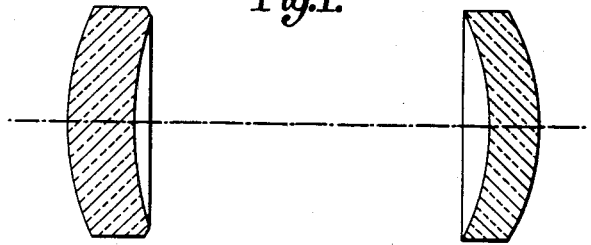

Prior Art.
Focal Length = 100.00
Focal Length of Front Element = 271.9
Focal Length of Rear Element = 135.0
Both Elements are of White Optical Glass.

Fig.2.

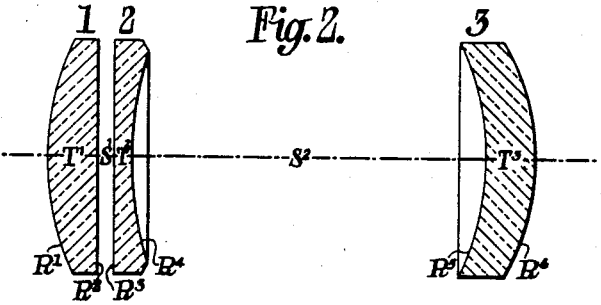

F:11.0: Focal Length = 100.00
Focal Length of Front Component = +286.0
D = 1.5230 ; G' = 1.5343 ; V = 59.0

| Lens. | Focal Length. | Radii | Thickness & Separation. |
|---|---|---|---|
| 1 | +67.0 | $R^1 = 35.8$ | $T^1 = 2.45$ |
|   |       | $R^2 = \infty$ | $S^1 = .67$ |
| 2 | -84.0 | $R^3 = \infty$ | $T^2 = .75$ |
|   |       | $R^4 = 44.9$ | $S^2 = 17.28$ |
| 3 | +135.0 | $R^5 = 35.0$ | $T^3 = 2.45$ |
|   |        | $R^6 = 23.2$ |  |

All Three Elements are of White Optical Glass.

Inventor
Donald L. Wood,
By Newton M. Perrine,
Rolla L. Carter
Attorneys

Patented Apr. 10, 1934

1,954,340

UNITED STATES PATENT OFFICE 1,954,340

PHOTOGRAPHIC OBJECTIVE

Donald L. Wood, Rochester, N. Y., assignor to Eastman Kodak Company, Rochester, N. Y., a corporation of New York Application January 30, 1933, Serial No. 654,206

5 Claims. (Cl. 88—57)

My present invention relates to a photographic objective and more particularly to an objective of the periscopic doublet type.

It has been common practice to use on relatively inexpensive hand cameras a periscopic doublet lens consisting of two meniscus elements, the rear one of which contained, from two-thirds to three-fourths of the total refractive power of the complete lens. This unsymmetrical construction was adopted to permit in the assembly of the camera the focusing of the lens by adjusting the rear element alone which is a quicker and cheaper operation than focusing by moving the entire lens.

Although such doublet lenses were quite satisfactory for the purpose for which they were designed in self-erecting folding cameras and box cameras they had to be used in a fixed focus position and when working at a relative aperture of about "f.11" the total range of sharp focus, for a lens of 100 m/m focal length was from 8 feet to infinity. Not realizing this limitation many users would disregard instructions and attempt to take pictures of subjects only 5 or 6 feet from the camera which naturally resulted in defective negatives and consequent dissatisfaction.

In periscopic lenses used heretofore in a fixed focus position on the camera, the lack of sharpness in the image has been due more to the fact that the object was considerably out of focus than to aberrations in the lens itself. The lens of this invention is not an attempt to improve upon the optical corrections of the lens formula but to eliminate this larger defect in the image caused by the object being out of focus for all distances other than the one upon which the camera is focused.

It being desirable to extend the range of distances at which sharp images could be secured the methods taught by the prior art were considered but were found to be impractical for the following reasons:

1. Focusing by moving the entire lens is out of the question in box cameras as usually constructed and in folding cameras any suitable arrangement for doing so is quite expensive.

2. Focusing by moving the rear element alone would be satisfactory were it not for the serious mechanical complications introduced because of the difficulty of designing a simple, cheap mechanism which will move the rear element inside the camera and at the same time be absolutely light tight.

3. Focusing by moving only the front element is mechanically simple but in the unsymmetrical lens system previously described the power of this element is so small that it would require a very large movement to cover the desired focus range.

Since the methods of the prior art were unsatisfactory for the purpose in mind it occurred to me that it might be possible to provide an arrangement whereby the mechanical simplicity of moving the front element could be utilized without the necessity of this movement being undesirably large.

The object of my invention is to produce an objective possessing the desirable properties of an unsymmetrical periscopic doublet and being amenable to being focused by means of a simple mechanical arrangement, and which is particularly suited to quantity production for box and folding hand cameras and has features which render manufacture and assembly simple and inexpensive.

I have found that if the front element of a periscopic doublet is split into two parts by a plano-surface the resulting plano-convex front element is several times as powerful in its influence on the camera focus as was the original front element, and in order to vary the focus a given amount this plano-convex element has to be moved but a small fraction of the movement necessary before the front element was split.

In the accompanying drawing Fig. 1 shows a well-known unsymmetrical periscopic doublet and Fig. 2 shows the objective obtained from the doublet lens of Fig. 1 when its weak front element is separated into two parts by plano-surfaces in accordance with my invention.

The objective specified in Fig. 2 is a preferred example and in the interest of economy in manufacture all three elements thereof are made from one kind of glass. As has been indicated above, this lens is not a highly corrected one, however, it will form a quite satisfactory image with good definition and by making the front component of two elements it is possible to adjust the focus of the objective by movement of the front lens 1 towards and from the second lens 2, as in a screw threaded mount. By this arrangement the cost of the objective is increased very slightly over the cost of the doublet lens shown in Fig. 1 while it provides a front element 1 having a focal length of 67 which is several times as powerful in its influence on the camera focus as the original front element shown in Fig. 1. By way of comparison it may be mentioned that when the objective of Fig. 1 is set to focus objects from 10 feet to infinity and it is desired to focus on an object at a distance of 5 feet it would be necessary to move the front element through a distance approximating an inch whereas with the objective of my invention as shown in Fig. 2 the same adjustment of focus may be had by moving the plano-convex front element a distance less than .10 inch. With such a small adjustment necessary it is obvious that a simple and practical arrangement can be provided without materially increasing the cost of the camera on which my improved objective is to be mounted.

In the accompanying table is set forth the data of a preferred example of the objective shown in Fig. 2.

The objective here specified is designed to work at f.11. In the table and on the accompanying drawing the successive lenses from front to rear are designated 1 to 3 respectively; the radii of curvature of the successive surfaces $R'$ to $R^6$; the thickness of the successive lenses $T'$ to $T^3$, and the width of the air spaces $S'$ to $S^2$. There is also given in the table the focal length of each of the lenses. All of the lenses are of white optical glass having an index of refraction for the D and G' lines of 1.5230 and 1.5343 respectively and a $\nu$ value of 59.0.

Dimensions are given in decimals of the focal length of the complete objective.

Table for objective with an aperture of "f.11"; focal length=100.

| Lens | Focal length | Radii | Thickness and separation |
|------|-------------|-------|--------------------------|
| 1    | +67.0       | $R^1$=35.8<br>$R^2$=∞ | $T^1$=2.45 |
| 2    | −84.0       | $R^3$=∞<br>$R^4$=44.9 | $S^1$= .67<br>$T^2$= .75<br>$S^2$=17.28 |
| 3    | +135.0      | $R^5$=33.0<br>$R^6$=23.2 | $T^3$= 2.45 |

Focal length of front component is +288.0.

While I have specified that all three lenses are made of one kind of glass some benefit may be had for the optical properties of the lenses by the use of dense flint glass for the negative lens.

It is to be understood that the above specified objective is an example and that I contemplate as within the scope of my invention such modifications and equivalents as fall within the terms of the appended claims.

What I claim as new and desire to secure by Letters Patent of the United States is:

1. A photographic objective having two positive components spaced apart by a distance greater than .15 of the focal length of the objective and comprising a rear component consisting of a single meniscus lens and a front component consisting of a plano-convex lens and a plano-concave lens positioned with their plano-surfaces facing each other and separated by an air space, each of the lenses of the objective being of same kind of glass.

2. A photographic objective comprising three air-spaced elements all of which are of glass having the same refractive index and the same dispersive ratio and in which a positive and a negative lens separated by an air space form a converging front component and a single positive meniscus lens forms a rear component the focal length of the front component being more than twice the focal length of the rear component.

3. A photographic objective comprising a converging front component consisting of a plano-convex lens and a plano-concave lens and constituting a focusing lens structure and a converging rear component consisting of a single meniscus lens spaced from the rear surface of the front component by a distance greater than .15 of the focal length of the objective and having a focal length less than one and one-half times the equivalent focal length of the objective.

4. A photographic objective comprising a front component and a rear component characterized by the front component being convergent and consisting of a plano-convex front element and a plano-concave rear element with their plano-surfaces separated by an air space and facing one another, and the rear component being a single meniscus lens with its concave surface facing the front component and supplying over 70% of the converging power of the objective.

5. A photographic objective comprising a front component and a rear component characterized by the front component being convergent and consisting of a plano-convex front element and a plano-concave rear element, the rear component being a single positive meniscus lens, all of the elements being of the same glass, and the focal length of the plano-convex front element being less than the focal length of the objective whereby relative small axial movement of the front plano-convex element will materially alter the focal length of the objective.

DONALD L. WOOD.